United States Patent Office 3,460,906
Patented Aug. 12, 1969

3,460,906
METAL HYDRIDE COMPOSITIONS AND PROCESS THEREFOR
Arnold Lenz, Cologne-Stammheim, and Karl Hass and Hans Epler, Ranzel-Kolonie, Germany, assignors to Dynamit Nobel Aktiengesellschaft, Troisdorf, Germany
No Drawing. Filed Feb. 23, 1965, Ser. No. 434,622
Claims priority, application Germany, Feb. 22, 1964, D 43,706
Int. Cl. C01b 6/04
U.S. Cl. 23—204        6 Claims

ABSTRACT OF THE DISCLOSURE

Stable alkali or alkaline earth metal hydride compositions whrein the hydride is coated with alkali metal hydroxide are produced by suspending the hydride in oil, combining the suspension with a melt of alkali metal hydroxide, agitating the resulting admixture for transfer of the metal hydride to the melt to form a dispersion of the metal hydride in the melt, separating the dispersion from the oil and cooling the dispersion to solidify the alkali metal hydroxide.

---

The subject of the invention is the manufacture of compositions containing alkali hydroxide and having a high alkali or alkaline earth hydride content.

As is known, the hydrides of the alkali metals and alkaline earth metals can be made by the action of hydrogen on the metals at elevated temperature in the fused state. While the hydrides of alkaline earths decompose under the influence of moisture into alkaline earth hydroxides and hydrogen, the hydrides of the alkalis ignite even on contact with the air. Consequently, the storage of hydrides of alkalis and alkaline earths requires the exclusion of moisture and, in the case of alkali hydrides, even the exclusion of gases containing oxygen. Storage with the exclusion of moisture and gases containing oxygen is not very difficult in general, since the hydrides can be transferred immediately after manufacture into suitable containers which meet the above requirements. Difficulties often occur, however, when it comes to the final user, who does not have the same familiarity with handling these materials as does the manufacturer, which is usually the case, sad to say, in non-chemical industries. This is why the above-mentioned hydrides have not achieved their rightful popularity, in spite of the low cost that makes them suitable for many applications.

Alkali hydrides can also be produced in fused alkali hydroxides from alkali metal and hydrogen at temperatures about 300° C. The product is a solution of about 2 to 3% sodium hydride in fused sodium hydroxide. This can be used, as a melt, for reduction processes in the metal working industry for the purpose of reducing metal oxides to the metal or to metal oxides of a lower stage of oxidation. It has been proposed, for example, to reduce scale (which consists of metal oxides) on metal surfaces to the metal or to oxides of lower oxidation stages which can be easily removed by treatment with acid. In this process the metal is immersed in the fused sodium hydroxide containing sodium hydride. The sodium hydride is consumed by the reduction of the metal oxides, and, since the fused sodium hydroxide when prepared in the above manner contains only 3% sodium hydride at most, its reducing capacity is rapidly exhausted. In order to maintain the reducing capacity, the sodium hydride must be continuously replenished. This should be done in the reduction bath itself, since it would not be economical to regenerate the bath elsewhere on account of the low hydride concentration that is achieved and the high transportation costs. Since the handling of fused sodium and hydrogen requires special safety precautions and especially trained personnel on account of the danger of fire and explosion, the above-described method of scale removal by sodium hydride has not been widely accepted. Many metal working companies are disinclined to use any such dangerous chemical processes.

It has now been found that the above-described and still other disadvantages of the hydrides of alkalis and alkaline earths can be avoided by preparing compositions containing alkali hydroxide and having a high alkali or alkaline earth hydride content by putting pure hydrides into molten alkali hydroxides while excluding moisture or gases containing oxygen.

Thus, the invention provides a composition comprising, in admixture, metal hydride and alkali metal hydroxide. The metal hydride can be an alkali metal hydride or an alkaline earth metal hydride, and the metal hydride is in the form of particles while the alkali metal hydroxide coats the particles. The composition is stable at ambient atmospheric conditions.

In the case of the alkali metal hydrides, the alkali metal hydroxide is preferably a mixture of sodium hydroxide and potassium hydroxide, and the eutectic mixture of these materials melting at about 185° C. provides good results. The composition including the alkali metal hydride and the alkali metal hydroxide can contain about 20–80, preferably 50–80 wt. percent of alkali metal hydride based on the weight of the hydride and hydroxide. In these compositions, the alkali hydride is preferably dispersed in the alkali metal hydroxide so that in a piece of the material the alkali metal hydroxide is a continuous phase in which particles of the alkali hydride are dispersed.

Where the metal hydride is an alkaline earth hydride, the alkali metal hydroxide can be in the from of thin layers coating the particles of the hydride. The particles of alkaline earth metal hydride have individual coatings of the hydroxide. In these compositions, the hydride can amount to 75–95 wt. percent based on the weight of the hydride and hydroxide.

The compositions of the present invention are particularly suitable, on account of their high hydride content, for replacing consumed reducing agents in the above-described reduction baths.

The compositions containing alkali hydroxide and having a high hydride content according to the invention are distinguished by extraordinarily great safety in handling. The danger of the self-ignition of compositions containing alkali hydride is practically eliminated.

The process of the invention can be performed in the simplest case as follows:

Pieces of hydride or compressed cakes of hydride are briefly immersed into fused alkali hydroxide. A coating of solidified alkali hydroxide then forms about the hydride, which protects it against the effect of air or moisture. Coating with an eutectic or approximately eutectic mixture of sodium hydroxide and potassium hydroxide has proven particularly advantageous in the case of sodium hydride. The eutectic mixture of sodium and potassium hydroxides, which consists of equimolar quantities of both, melts at approximately 185° C. At this temperature, the hydrogen partial pressure of the sodium hydride is so slight that no noticeable losses of hydrogen and hence of hydride can occur when the sodium hydride is put into the melt. At the fusion temperature of sodium hydroxide, however, which is above 300° C., the hydrogen partial pressure amounts to several torr, so that in this case considerable sodium hydride decomposition would occur. This is particularly significant since in practice a temperature of about 350° C. is needed in order to be able to stir sodium hydride into the melt. At lower temperatures, in the case of high concentrations of hydride, the sodium hydroxide melt is no longer liquid and hence it can no longer be cast into molds.

Another form of the process of the invention consists in stirring dry hydride into a melt of alkali hydroxide, preferably a mixture of sodium and potassium hydroxides having the composition of a eutectic having a melting point of about 185° C. The mixing is carried out at a temperature of over 185° C., preferably 190 to 250° C., under inert gas or hydrogen as the protective gas, until the mixture is still barely castable, and then it is poured into molds or cans under protective gas. After cooling, the castings can be used as such or in broken form, and can be placed in transportation containers.

Another embodiment of the present invention consists in using a metal hydride, e.g., alkali metal hydride, particularly, sodium hydride, suspension in oil, with a hydride content which may vary from 10-40 wt. percent, preferably 15-35 wt. percent, but contents higher than 40 wt. percent may be used as well, depending on the size of metal hydride particles. The size of the metal hydride particles may vary from 5-100μ, preferably from 10-50μ. All kinds of oil may be used in this procedure, being inert to the metal hydride applied and the alkali metal hydroxides. The oil suspension can be stirred into the alkali hydroxide melt, preferably the eutectic or approximately eutectic melt of sodium hydroxide and potassium hydroxide, at 190 to 250° C., preferably 200 to 220° C. Surprisingly, the sodium hydride quickly passes from the oil into the melt. After the agitation is stopped, the hydride-containing melt settles to the botom, while the practically hydride-free oil forms the upper stratum. The hydride-containing melt can be drawn off at the bottom and cast into molds. The supernatant oil can be drawn off at the top, or drained out at the bottom after the melt has been removed.

The use of oil makes handling of the hydride safer. As is known, precautions are necessary when handling pure hydrides.

Another advantageous embodiment of the process consists in placing a eutectic or approximately eutectic sodium hydroxide-potassium hydroxide fused mass in a heatable kneader, planetary agitator or mixer with an extruding machine attached and working sodium hydride into it under a protective gas. After the desired hydride content is reached, preferably 30 to 80%, the plastic mixture is transferred to a heatable worm-type extruding press or the like and extended or briquetted, or is extruded in continuous form by the extruding machine connected to the mixer, and then, while still warm, or after cooling, be cut up into pieces of appropriate size and packed in containers.

The following examples are intended to illustrate the new process:

Example 1

1 kg. of a eutectic mixture of sodium hydroxide and potassium hydroxide was placed in a heatable kneader with a 5 liter capacity, melted down and heated to 240° C. 3 kg. of sodium hydride in lumps were then gradually added under a nitrogen shield, and after the mixture had been blended the temperature was lowered while the kneader was still running. At about 200° C. the mass began to become friable. Upon further cooling the mixture solidified completely and the kneader was shut off to prevent any pulverization of the material. After cooling, a portion of the mixture, consisting of 75% hydride and 25% alkali hydroxide, was placed in a heatable hollow cylinder whose bottom end was closed off with an iron plate, and heated to about 220° C. Then the mixture, which had become plastic, was first compressed with a ram and then, after removing the bottom plate, forced out of the cylinder. A cylindrical bar is obtained, which, after cooling, can be handled without ignition in the open air.

Example 2

150 kg. of a eutectic mixture of sodium hydroxide and potassium hydroxide was placed in a heatable kettle equipped with an agitator and shielded with nitrogen, and the mixture was then fused and heated to about 200° C. to this melt was added 250 kg. of a 20 wt. percent suspension of sodium hydride in paraffin oil, traded by Esso under the trade name Bayol, and the sodium hydride particles had a size varying from 5 to 20μ, this suspension being let in slowly while the kettle temperature was raised to a maximum of 240° C. with the agitator running. After about one more hour of continued agitation (after all of the hydride suspension had been added), the agitator was shut off, and after another half hour the melt was tapped from the kettle into molds shielded with nitrogen. After the melt had been drained out, the oil was drained separately. After solidification the casting can be placed in appropriate containers for transportation.

Example 3

Calcium hydride in lump form of nut size was briefly immersed into a bath of fused sodium hydroxide at 350° C. by means of a screen-like conveyor belt. An excess of the molten sodium hydroxide flows back into the bath containing the melt. This procedure is conducted under a cover of an inert gas. Dry nitrogen was used in this example, but hydrogen can be used as well. The pieces of hydride have a thin coating after the sodium hydroxide cools, which protects the hydride against the access of moisture. The resulting coating had a thickness of about 1 mm.

Whereas the invention has been described in particular with reference to sodium hydride and calcium hydride, it is applicable, in the manner described, to other hydrides of the groups mentioned. Thus, the invention is applicable to lithium hydride and to barium hydride. Also other alkali metal hydroxides can be used. Thus lithium hydroxide can be used.

to particular embodiments thereof, it will be appreciated that these embodiments are merely representative of the invention and do not serve to define the limits thereof.

What is claimed is:

1. Process for production of a composition containing a metal hydride selected from the group consisting of alkali metal hydride and alkaline earth metal hydride, which is stable in ambient atmospheric conditions, which comprises suspending the hydride in oil, combining the resulting suspension with a melt of alkali metal hydroxide, agitating the resulting admixture of suspension and alkali metal hydroxide for transfer of the metal hydride to the melt to form a dispersion of the metal hydride in the melt, separating said dispersion from the oil, and cooling the dispersion to solidify the alkali metal hydroxide.

2. Process according to claim 1, wherein the metal hydride is alkali metal hydride.

3. Process according to claim 2, wherein the metal hydride is sodium hydride.

4. Process according to claim 1, wherein the amount of metal hydride in said oil suspension is about 10–40 wt. percent based on the metal hydride and oil.

5. Process according to claim 1, wherein said alkali metal hydroxide is eutectic mixture of sodium hydroxide and potassium hydroxide melting at about 185° C.

6. Process according to claim 1, wherein the metal hydride is sodium hydride, and the amount of sodium hydride in said oil suspension is about 10–40 wt. percent based on the metal hydride in oil, and said alkaline metal hydroxide is eutectic mixture of sodium hydroxide and potassium hydroxide melting at about 185° C.

References Cited

UNITED STATES PATENTS 2,702,281    2/1955    Gibb _____ 23—204 XR

FOREIGN PATENTS 139,651    1961    U.S.S.R.

OTHER REFERENCES

Mellor, "A Comprehensive Treatise on Inorganic and Theoretical Chemistry," 1922, vol. II, p. 500 (copy in Sci. Lib.).

MILTON WEISSMAN, Primary Examiner

U.S. Cl. X.R.

252—188

PO-1050
(5/69)

UNITED STATES PATENT OFFICE
CERTIFICATE OF CORRECTION

Patent No. 3,460,906            Dated Aug. 12, 1969

Inventor(s) Arnold Lenz, et al.

It is certified that error appears in the above-identified patent and that said Letters Patent are hereby corrected as shown below:

Col. 4, following line 61, insert
--Whereas the invention has been described with respect

SIGNED AND SEALED

MAY 12 1970

(SEAL)
Attest:

Edward M. Fletcher, Jr.
Attesting Officer

WILLIAM E. SCHUYLER, JR.
Commissioner of Patents